United States Patent [19]
Krisko et al.

[11] Patent Number: 6,142,642
[45] Date of Patent: *Nov. 7, 2000

[54] BENDABLE MIRRORS AND METHOD OF MANUFACTURE

[75] Inventors: Annette J. Krisko; Wayne L. Hoffman, both of Spring Green; Scott A. Maxwell, Lone Rock, all of Wis.

[73] Assignee: Cardinal IG Company, Minnetonka, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/496,906

[22] Filed: Jun. 29, 1995

[51] Int. Cl.$^7$ .............................. G02B 5/08; G02B 1/10
[52] U.S. Cl. ..................... 359/883; 359/884; 359/584; 359/585; 359/588; 359/589; 427/165; 427/167
[58] Field of Search ..................... 359/883, 884, 359/584, 585, 586, 588, 589, 900; 427/165, 167

[56] References Cited

U.S. PATENT DOCUMENTS

| | | |
|---|---|---|
| 3,770,335 | 11/1973 | Colburn et al. . |
| 4,166,018 | 8/1979 | Chapin . |
| 4,482,209 | 11/1984 | Grewal et al. . |
| 4,547,432 | 10/1985 | Pitts et al. . |
| 4,610,771 | 9/1986 | Gillery . |
| 4,666,263 | 5/1987 | Petcavich . |
| 4,826,525 | 5/1989 | Chesworth et al. . |
| 4,847,157 | 7/1989 | Goodman et al. . |
| 4,898,790 | 2/1990 | Finley . |
| 4,955,705 | 9/1990 | Nakajima et al. ...................... 359/884 |
| 4,956,001 | 9/1990 | Kitagawa et al. . |
| 4,963,012 | 10/1990 | Tracy et al. . |
| 5,059,295 | 10/1991 | Finley . |
| 5,085,926 | 2/1992 | Iida et al. . |
| 5,112,693 | 5/1992 | Gillery . |
| 5,215,832 | 6/1993 | Hughes et al. . |
| 5,216,551 | 6/1993 | Fujii ......................................... 359/883 |
| 5,267,081 | 11/1993 | Pein ......................................... 359/884 |
| 5,270,517 | 12/1993 | Finley . |
| 5,296,302 | 3/1994 | O'Shaughnessy et al. . |
| 5,324,373 | 6/1994 | Gillner et al. . |
| 5,344,718 | 9/1994 | Hartig et al. . |
| 5,376,455 | 12/1994 | Hartig et al. . |
| 5,424,876 | 6/1995 | Fujii ......................................... 359/883 |
| 5,505,989 | 4/1996 | Jenkinson ................................ 427/166 |
| 5,535,056 | 7/1996 | Caskey et al. ........................... 359/884 |

FOREIGN PATENT DOCUMENTS

| | | |
|---|---|---|
| 0456488 | 11/1991 | European Pat. Off. ............... 359/884 |
| 0 546 470 | 6/1993 | European Pat. Off. . |
| 3 191 301 | 8/1991 | Japan . |
| 4-86157 | 3/1992 | Japan . |
| 2224366 | 5/1990 | United Kingdom ................... 359/884 |
| 2268509 | 1/1994 | United Kingdom . |
| WO 91/16197 | 10/1991 | WIPO . |

OTHER PUBLICATIONS

Vvedenskii et al; "Wide–band reflectors based on silver films"; Sov. J. Opt. Technol, 50 (12), Dec. 1983; p. 781.

Golubenko et al; "Propagation of picosecond pulses through light guides"; Sov. J. Opt. Technol 50 (12), Dec. 1983; p. 782.

*Primary Examiner*—Ricky D. Shafer
*Attorney, Agent, or Firm*—Fredrikson & Byron, PA

[57] ABSTRACT

A heat formable mirror is formed by sputter depositing upon a sheet such as glass a reflective coating utilizing a base layer of silicon or a combination of silicon and stainless steel films, a reflective layer formed of a reflective metallic film such as titanium or aluminum, and a protective layer comprising preferably silicon nitride. The resulting mirror can be heat formed at elevated temperatures to form a curved mirror having a reflective coating free of objectionable defects.

7 Claims, 1 Drawing Sheet

BENDABLE MIRRORS AND METHOD OF MANUFACTURE

FIELD OF THE INVENTION

The present invention relates to mirrors, and more particularly to mirrors that are formed utilizing flat substrates which subsequently are heat-bent into a desired curve configuration.

BACKGROUND OF THE INVENTION

Curved mirrors commonly are employed as rearview mirrors for motor vehicles, as reflecting surfaces for telescopes, and the like. Curved mirrors commonly are formed by first forming a glass sheet or other sheet-like substrate into the desired curved configuration, and subsequently applying a reflective coating to one side or the other of the substrate. For example, curved mirrors of the type used in carnivals to provide amusing, contorted reflections of a viewer may be made by first forming a sheet of glass into the desired shape, and then coating one surface of the glass with metallic silver and a protective paint overcoat.

Mirrors also can be manufactured by employing a magnetron sputtering technique such as that described in Chapin, U.S. Pat. No. 4,166,018. Mirrors of this type may use chromium or silver as the reflective layer. When curved mirrors are manufactured using a magnetron sputtering process, the glass substrates for the mirrors are first bent as desired typically in a size that would produce two or more mirrors. After the bent glass pieces are washed in a curved glass batch-type washer or on a carrier in an on-line washing system, they are placed on an appropriate carrier and are coated by magnetron sputtering. Due to the curvature of the substrates, the reflective coatings that are thus produced have not been uniform. The manufacturing process itself is tedious and time-consuming inasmuch as it requires multiple small glass substrates to be laid by hand upon a carrier that passes through a magnetron sputtering apparatus and requires each of the resulting individual mirror pieces to be removed by hand from the carrier sheet once the sputtering operation is complete.

To avoid these problems, it would be desirable to first sputter deposit a reflective coating on a flat glass sheet or other substrate to form a mirror, and then bend and cut the mirror as desired. However, a problem arises when flat glass sheets are coated with the usual reflecting layer using chromium, for example, as the reflective metal, and then are heat-bent. Once the coated sheets are heated to a temperature sufficient to enable permanent deformation—that is, plastic flow—of the substrate to occur (approximately 1110–1130° F. for glass), and the glass is bent, the coatings tend to develop defects which may be referred to as pits. The pits appear as visually detectable small, circular defects having little reflectance. The reason for the development of pitting is not fully understood, but is believed to be a function of stresses developed during the bending operation in one or more of the reflective sputter deposited films forming the reflective layer.

SUMMARY OF THE INVENTION

The present invention relates to a heat-formable mirror that is capable of being configured at elevated temperatures into a curved mirror without significant damage to the reflective coating. The reflective coating comprises three layers. The first layer is a sputter-deposited base layer comprising a layer formed of a film of silicon or a layer formed of silicon and stainless steel films with the silicon film nearer the substrate than the stainless steel film. The second layer is a reflective layer that is positioned further from the substrate than the base layer. It is formed by sputter deposition of a reflective metallic film such as titanium or aluminum, titanium being preferred. The third layer is a protective film that is positioned further from the substrate than the reflective layer, the protective film providing sufficient oxygen permeation inhibition as to prevent the reflectance of the mirror from decreasing to less than 50% upon heat bending. The third layer preferably comprises sputter-deposited silicon nitride, sputter-deposited aluminum oxide or sputter-deposited silicon dioxide; of these, silicon nitride is preferred.

When a heat-formable mirror of the invention is heat formed at a temperature above the temperature at which the layers of the reflective coating are deposited, atomic diffusion and/or structural rearrangements can occur between the various sputtered films, changing the reflective properties of the bent mirror product. The heat formable mirrors of the invention, however, largely and preferably fully retain their important mirror optical properties (low transmissivity, high reflectance) when subjected to heating and bending in this manner.

Thus, in another embodiment, the invention relates to a curved mirror that is produced by providing a heat-formable mirror of the type described above, and subjecting the mirror to a temperature at which the substrate is capable of plastic deformation (e.g., the glass transition temperature in the case of glass substrates), bending the flat mirror at that temperature into a desired curved conformation to produce a curved mirror, and then cooling the curved mirror while maintaining its curved conformation. The resulting curved mirror desirably retains at least about 100% of the reflectance and not over about 150% of the transmissivity of the heat-formable flat mirror from which it was made.

Curved mirrors of the invention desirably display a hemispherical reflectance (as measured using a reflectometer and integrating sphere over the wavelength range of 200 to 2600 nm) of at least 50% and a transmissivity not greater than about 4.0%. "Reflectance" herein is measured using a reflectometer utilizing a tungsten lamp at a filament temperature of 2854° K at an angle of incidence of 25°±5° utilizing a detector cell approximately duplicating the human eye (CIE standard photopic curve) and an integrating sphere. In addition to good optical properties for a mirror product, the film stack should be physically and chemically durable in both the flat and bent states.

DETAILED DESCRIPTION OF THE PREFERRED EMBODIMENTS

Figure 1:
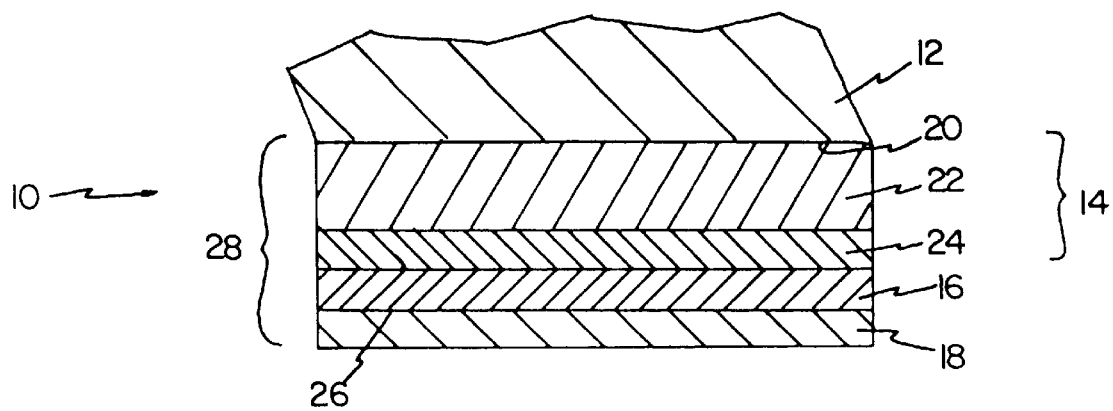
FIG. 1 is a broken-away, cross-sectional schematic view of a heat-formable mirror of the invention.

FIG. 1 shows a heat-formable mirror 10 of the invention in which the flat, sheet-like substrate 12 is glass. Glass is the preferred substrate, but other substrates that are capable of plastic flow when heated, such as plastic (eg., poly (methylmethacrylate)), and metals (eg., aluminum) may also be used. Sputter-deposited on the flat surface 20 of the substrate in sequence is a base layer 14, a reflective layer 16 and a protective layer 18, to form a reflective coating. In the embodiment of FIG. 1, the base layer 14 is sputter coated directly upon a flat surface 20 of the substrate. The base layer comprises a film 22 of silicon that is sputter deposited upon the glass surface using a magnetron sputtering technique of the type described in Chapin, U.S. Pat. No. 4,166,018, the teachings of which are incorporated herein by reference. "Sputter deposition", "sputter deposited", and the like are used herein to refer to coatings of the type produced by magnetron sputtering. Magnetron sputtering techniques are well known in the art.

The silicon film 22, it will be understood, may be deposited from a silicon target in an argon atmosphere at about 3 mT. The silicon film 22 can vary substantially in thickness, but desirably is between about 300 Å and about 1500 Å in thickness. Silicon films 400 Å in thickness have given good results. Although we do not wish to be bound to the following explanation, it appears that the silicon layer tends to reduce the physical stresses that are set up in the reflective coating when the heat-formable mirror is bent. However, the use of thicker silicon films may lead to reductions in reflectivity of the bent mirror, and hence some care must be exercised in controlling the silicon film thickness.

As shown in FIG. 1, the base layer 14 includes a stainless steel film 24 deposited over the silicon film 22. The stainless steel film 24 serves to reduce transmissivity of the reflective coating and increases reflectivity. The thickness of the stainless steel layer 24 may vary considerably, but preferably is in the range of about 50 Å to about 250 Å with the best results being obtained when the stainless steel layer is of a thickness not exceeding about 225 Å. An additional purpose of the stainless steel film 24 is to inhibit reaction between the underlying silicon film 22 and the reflective metal film 16 which is subsequently applied. For example, in the absence of the stainless steel layer 24, reaction between the silicon film 22 and titanium film 16 can result in the formation of titanium silicide, which may reduce reflectivity of the reflective coating.

Referring again to FIG. 1, a reflective layer 16 is provided over the base layer 14. Layer 16 desirably is formed through sputter deposition of a reflective metallic film; titanium and aluminum metals typify the reflective metal that can be used for layer 16, with titanium being the preferred metal. The thickness of the reflective layer 16 should be such as to provide the mirror with a reflectance (hemispherical reflectance as measured using a reflectometer and integrating sphere over the wavelength range of 200 to 2600 nm) of at least 50% and a transmissivity not greater than about 4.0%. Reflectance occurs primarily from the outer surface 26 of the layer 16. As noted above, the underlying stainless steel layer contributes to reflectivity. Preferably, the reflective layer 16 is of sputter deposited titanium metal having a thickness in the range of 100 Å–250 Å with a thickness of about 175 Å giving good results.

Shown at 18 in FIG. 1 is a protective layer which desirably is sputter deposited directly upon the metallic reflective layer 16, the protective layer being of a physically and chemically durable material that inhibits oxygen permeation to the underlying metal layer or layers during bending. The protective layer desirably inhibits oxygen permeability sufficiently to prevent reflectivity from being reduced to less than 50% during heat bending. Films of silicon nitride or aluminum oxide may be employed as or in the protective layer, and it is contemplated that films of silicon dioxide also could be employed. Sputter deposited silicon nitride films are preferred, and may range in thickness from about 50 Å to about 150 Å with thicknesses in the range of about 100 Å being preferred.

Figure 2:
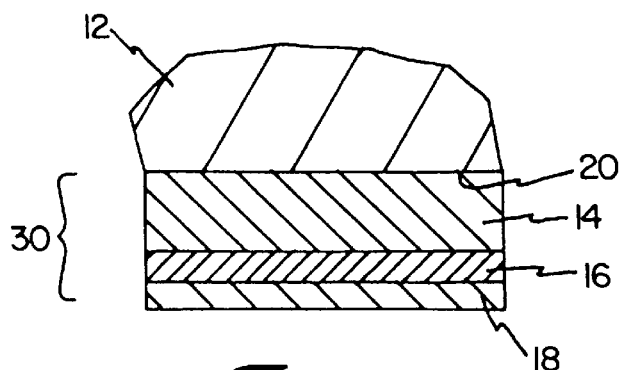
FIG. 2 is a broken-away, schematic, cross-sectional view of another embodiment of the invention.

Referring now to FIG. 2, a reflective coating 30 is depicted upon the flat surface 20 of a glass sheet 12, the layers of the reflective coating being identical to those of FIG. 1 except that the stainless steel layer 24 of FIG. 1 is omitted. That is, the base layer 14 of FIG. 2 is a film of sputter deposited silicon, the reflective layer 16 is a sputter deposited film of a reflective metal such as titanium or aluminum, and the protective layer 18 comprises a film of silicon nitride or aluminum oxide.

It will be understood that other and further layers of sputtered materials may be positioned between or on either side of the base layer, the reflective layer and the protective layer, provided such additional layers do not contribute to objectionable pitting or other failure of the reflective coating when the mirror is subject to heat forming. For example, stainless steel may be added at the substrate to further reduce transmissivity. Thin aluminum or silver films may be added above or below the reflective layer for the purpose of increasing reflectivity. Preferably, however, the respective base, reflective and protective layers are contiguous, that is, they are formed without intermediate layers between them. Thus, the base layer 14 preferably is formed directly upon the flat surface 20 of a glass or other substrate, and to the extent that the base layer 14 is formed of silicon and stainless steel films 22, 24, the latter films desirably are formed with the stainless steel film 24 directly sputter deposited upon the silicon film 22. The reflective metal film 16 desirably is formed by sputter deposition of titanium or aluminum directly upon the exposed surface of the base layer 14. The protective layer 18, in similar fashion, desirably is sputter deposited directly upon the reflective layer 16.

Figure 3:
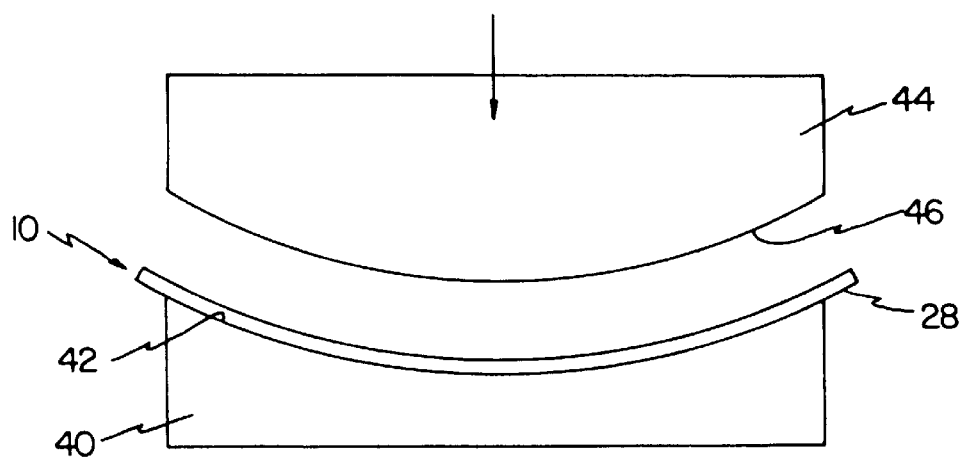
FIG. 3 is a schematic view showing the use of a heat-bending apparatus.

FIG. 3 depicts a heated mold useful in the heat-formation of curved glass sheets. Molds of this type are commonly used for this purpose in the formation of, for example, curved automobile windshields and curved glass sheets that are subsequently to be provided with a mirrored surface for use as motor vehicle rearview mirrors and the like. The mold consists of a female part 40 having a concave upper surface 42, and a male portion 44 having a downwardly facing convex surface 46. In use, the mold portions are heated to the softening temperature of glass, and a heat bendable mirror such as that described in connection with FIG. 1 is placed upon the surface of the female member with its reflective coating 28 facing downwardly. As the flat glass sheet is heated to its softening point, it sags downwardly into conformation with the upper surface 42 of the mold. The male mold portion 44 is then urged downwardly against the other surface of the glass sheet and serves to ensure smooth conformation of the glass sheet against the surface 42. Once bending has been completed, the molds are cooled below the glass transition point of the mirror 10, the mold parts are separated and the bent mirror is removed. The mold operating temperatures commonly are in the range of 1110–1130° F.

The reflective coatings of mirrors of the invention, before and after bending, should demonstrate substantial durability. That is, the coatings should exhibit resistance to abrasion, to heat and cold extremes, to humidity, and to solvents such as alcohols and salt spray. Resistance to abrasion may be measured by sliding an ordinary pencil eraser (Blaisdell® #536T or equivalent), weighted with a 1 kg load, back and forth over a methanol-cleaned coated surface for 100 cycles. To pass, the coating should not display significant film loss or loss of reflectivity. Adherence of the sputtered-on film stack to the substrate can be tested by attempting to pull off the coating with a pressure-sensitive adhesive tape, as described in MIL-C-48497A. Resistance to alcohol may be tested by rubbing an area on the coating with an isopropanol-soaked clean cloth under hand pressure. A salt spray test is described in ASTM B-117, and is continued for 240 hours. To test for resistance to humidity, a coated specimen is exposed for 500 hours in a humidity chamber maintained at 45° C. and 98%–100% relative humidity. After each of the tests described above, the tested coatings are visually examined to detect any defects.

EXAMPLE 1

Using a commercial magnetron sputtering line, the upper, cleaned surface of flat glass sheets were exposed to sputtering from various targets in a series of successive zones, the speed of travel of the glass sheets and the electric power delivered to the various magnetron sputtering units being such as to provide the desired thicknesses of the various sputtered films. Three of the zones initially encountered by the glass sheets were provided with silicon targets and an argon atmosphere, resulting in the sputter deposition of a silicon film having a thickness of about 400 Å. The sheets then passed into a zone in which stainless steel was sputtered from a stainless steel target to a thickness of approximately 175 Å. Following the stainless steel zone, the glass sheets passed through a zone having a titanium target in an argon atmosphere, and titanium metal was sputtered onto the stainless steel surface to a thickness of about 200 Å. Finally, after exiting the titanium zone, the glass sheets passed into two sequential zones having silicon targets in a nitrogen atmosphere, and silicon nitride was sputter deposited to a final thickness of about 100 Å. The resulting heat-formable mirror was measured for transmission, reflectance and color properties and was then subjected to the bending procedure described above at a temperature of approximately 1130° F. Upon removal of the resulting curved mirror from the mold, the mirror was examined for coating defects and was also subjected to reflectance, transmissivity, color and durability testing. No haze or other physical defect was observed. Reflectance before and after bending was 57%, transmittance of the bent mirror was 2.2%, and the reflective color coordinates of the bent film (Hunter L,a,b System, Illuminant D 65) were a=1.22 and b=5.80. Analysis of the finished product indicated some diffusion of iron and chromium from the stainless steel layer into the silicon layer to form silicides, without harmful effect upon the mirror.

EXAMPLE 2

A heat-formable mirror was formed in a manner substantially identical to that of Example 1 except that the stainless steel sputtering zone was omitted. The reflective coating of the resulting mirror thus consisted of a base layer consisting of a silicon film having a thickness of about 960 Å, a reflective layer of titanium metal having a thickness of about 125 Å, and a protective layer of silicon nitride at a thickness of approximately 100 Å. The mirror was heat formed by bending as described above in connection with Example 1, and reflectance, transmission and color properties were measured before and after the bending procedure. The bent mirror was also inspected for pitting and other defects. No visual defects or haze was noted either before or after bending. Reflectivity of 50% was obtained before and after bending, and transmissivity after bending was measured as 3.8%. The bent product exhibited reflected color coordinates of a=−0.45, b=2.38.

To see what chemical changes may have occurred during the heat-forming process, the reflective coating of the bent mirror resulting from Example 2 was subjected to analysis using Auger electron spectroscopy (AES). It was found that the silicon film had reacted with the contiguous titanium metal film to yield a layer of titanium silicide and caused a reduction in reflectivity of the reflective coating. One purpose of the stainless steel film employed in the reflective coating shown in FIG. 1 is to serve as a barrier between the silicon and titanium films to inhibit reaction between them. Notwithstanding the reaction between the silicon and titanium films, the curved mirror resulting from Example 2 was found to be substantially free of defects and remained highly reflective.

While a preferred embodiment of the present invention has been described, it should be understood that various changes, adaptations and modifications may be made therein without departing from the spirit of the invention and the scope of the appended claims.

What is claimed is:

1. A heat formable mirror comprising a flat substrate capable of plastic flow upon application of heat, and a sputter-deposited reflective coating formed on a surface of the substrate, the mirror being formable at elevated temperatures without significant damage to the reflective coating, the reflective coating comprising:

a. a sputter-deposited base layer comprising a sputter-deposited silicon film having a thickness of 300–1500 Å, b. a reflective layer positioned further from the substrate than the base layer and formed by sputter deposition of a reflective metallic film;

c. between said silicon film and said reflective layer, a sputter-deposited stainless-steel film having a thickness of 50–250 Å; and d. a durable protective layer positioned further from the substrate than either the base layer or the reflective layer, the protective layer providing sufficient oxygen permeation inhibition as to prevent the reflectance of the mirror from decreasing upon heat bending to less than 50%.

2. The mirror of claim 1 wherein the durable protective layer comprises silicon nitride, aluminum oxide or silicon oxide.

3. The mirror of claim 1 wherein said reflective layer is sputter-deposited titanium or aluminum.

4. The mirror of claim 1 wherein said reflective layer is sputter-deposited titanium metal having a thickness of 50–250Å.

5. The mirror of claim 1 wherein the substrate is glass.

6. A heat-formable mirror comprising a flat glass substrate and a multi-layer sputter-deposited reflective coating formed on one surface of the substrate, the mirror being formable at the softening temperature of the glass substrate without significant physical damage to the reflective coating, the reflective coating comprising a sputter-deposited silicon film, a reflective layer comprising a sputter-deposited titanium film positioned further from the substrate than the silicon film, a sputter-deposited film of stainless steel positioned between the silicon film and the titanium film, and a protective layer comprising a sputter-deposited silicon nitride film positioned further from the substrate than the titanium film, the respective film having thicknesses providing the reflective coating with a transmissivity of not greater than about 4% and a reflectance not less than about 50%.

7. The mirror of claim 6 wherein said titanium film is not greater than about 225 Å in thickness.

* * * * *